(12) United States Patent
Cornelissen et al.

(10) Patent No.: US 11,649,944 B2
(45) Date of Patent: May 16, 2023

(54) LIGHTING DEVICE

(71) Applicant: SIGNIFY HOLDING B.V., Eindhoven (NL)

(72) Inventors: Hugo Johan Cornelissen, Escharen (NL); Olexandr Valentynovych Vdovin, Maarheeze (NL); Ludovicus Johannes Lambertus Haenen, Sint Oedenrode (NL); Norbertus Antonius Maria Sweegers, Lierop (NL); Marc Andre De Samber, Lommel (BE); Jochen Renaat Van Gheluwe, Lommel (BE)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/427,962

(22) PCT Filed: Feb. 4, 2020

(86) PCT No.: PCT/EP2020/052736
§ 371 (c)(1),
(2) Date: Aug. 3, 2021

(87) PCT Pub. No.: WO2020/161124
PCT Pub. Date: Aug. 13, 2020

(65) Prior Publication Data
US 2022/0010942 A1    Jan. 13, 2022

(30) Foreign Application Priority Data
Feb. 8, 2019   (EP) .................................... 19156124

(51) Int. Cl.
*F21V 5/00*       (2018.01)
*F21V 3/06*       (2018.01)
(Continued)

(52) U.S. Cl.
CPC ............ *F21V 5/004* (2013.01); *F21V 3/0615* (2018.02); *F21V 5/007* (2013.01); *F21V 11/14* (2013.01); *F21Y 2115/10* (2016.08)

(58) Field of Classification Search
CPC ........ F21V 5/004; F21V 3/0615; F21V 5/007; F21V 11/14; F21V 5/002; F21V 11/00;
(Continued)

(56) References Cited

U.S. PATENT DOCUMENTS 7,806,547 B2 * 10/2010 Benitez ................ G02B 6/0036
362/97.3
2008/0304250 A1   12/2008 Harbers et al.
(Continued)

FOREIGN PATENT DOCUMENTS

WO        2017182370 A1    10/2017

*Primary Examiner* — Bao Q Truong

(57) ABSTRACT

A lighting device (1) comprising a light generating element (2; 3), and a micro-lens (4) comprising a focal plane ($F_p$), wherein the light generating element (2; 3) comprises a first light generating component (2) and a second light generating component (3), wherein the first light generating component (2) comprises a light emitting surface (28) adapted for providing a diffuse light output component, wherein the second light generating component (3) comprises at least one array of light sources (3) adapted for providing a directional light output component, wherein the light generating element (2; 3) is arranged to emit a light output towards the micro-lens array (4), the light output being formed by a superposition of the diffuse light output component and the directional light N output component, and wherein the array of the light sources (3) is located in the focal plane ($F_p$) of the micro-lens array (4).

15 Claims, 6 Drawing Sheets

(51) Int. Cl.
*F21V 11/14* (2006.01)
*F21Y 115/10* (2016.01)

(58) Field of Classification Search
CPC .......... F21V 11/08; F21V 13/00; F21V 13/04; F21V 13/14; F21V 2200/00; F21V 2200/20; F21Y 2115/10
See application file for complete search history.

(56) References Cited

U.S. PATENT DOCUMENTS

| | | |
|---|---|---|
| 2010/0061090 A1 | 3/2010 | Bergman et al. |
| 2016/0010811 A1* | 1/2016 | Benitez ................. F21V 11/186 362/147 |
| 2016/0215961 A1* | 7/2016 | Kjeldsen ................. F21V 13/02 |
| 2018/0259155 A1 | 9/2018 | Di Trapani |

* cited by examiner

LIGHTING DEVICE

CROSS-REFERENCE TO PRIOR APPLICATIONS

This application is the U.S. National Phase application under 35 U.S.C. § 371 of International Application No. PCT/EP2020/052736, filed on Feb. 4, 2020, which claims the benefit of European Patent Application No. 19156124.0, filed on Feb. 8, 2019. These applications are hereby incorporated by reference herein.

FIELD OF THE INVENTION

The present invention relates to lighting devices for mimicking a moving light source at different viewing angles. More particularly, the present invention relates to a lighting device comprising a light generating element and a micro-lens array comprising a focal plane.

As used herein, the expression aperture pitch is intended to refer to the distance between the centers of two neighboring light extraction elements in the form of apertures in an array of apertures.

As used herein, the expression micro-lens pitch is intended to refer to the distance between the centers of two neighboring lenses in a micro-lens array.

As used herein, the term light source is intended to be interpreted broadly and to encompass not only "real" light sources such as LEDs, but also "virtual" light sources such as light extraction structures in a light guide, and apertures and/or light extraction elements in a layer.

BACKGROUND OF THE INVENTION

Within lighting devices there is a hardly explored category of lighting devices with mixed functionality of illumination and surprising visual appearance. Particularly, it is suggested that looking to the lighting device light source itself, i.e. the luminance distribution of the light source, can contribute to a natural experience of light. Thereby e.g. daylight or sunlight may be mimicked. The virtual presence of a sun-like light source provides a feeling of comfort, like a natural environment.

An example of an existing such lighting device simulating a natural light source is the lighting device marketed under the name CoeLux 60HC by company CoeLux. This lighting device is a ceiling lighting device which creates an intense directional beam of white light plus a low-brightness diffuse blue area mimicking a blue-sky effect.

The data sheets available on the CoeLux HC series, however, reveals clearly that this lighting device is a very complicated and high-priced system that has not really found its way to the market (except e.g. in hospitality). The total thickness (build-in depth) of a 45HC system for a 0.5 m² light source is 0.7 m, with a total weight of 300 kg. The installation (hidden) surface is much larger than the source: 2.3×1.7 m. Large luminous affordable areas are therefore difficult to realize with this type of systems.

It is therefore the ambition of the present invention to define concepts that offer comparable light effects embedded in a standard-like lighting device at a reasonable price point, with low weight and limited thickness (in the cm range).

US 2018/259155 A1 discloses an artificial illumination device for generating natural light similar to that from the sun and the sky. The device has a direct-light source that is configured to produce, from primary light, direct light exiting a first emitting surface into a direct-light direction at low divergence. The direct-light source has a plurality of pairs of a first light-emitting device positioned upstream the first emitting surface and configured to emit the primary light and a collimator configured to collimate the primary light emitted by the first light-emitting device along the direct-light direction. The device also has a diffused-light generator configured to cause diffused light at a second emitting surface. The direct-light source and the diffused-light generator co-operate to form outer light at the outer emitting surface, having a first light component propagating within a low divergence cone along the direct light direction and a second light component propagating along directions outside the low divergence cone. The first light component has a correlated color temperature lower than that of the second light component. When looking towards the first emitting surface, an observer sees a bright spot surrounded by a bluish background which mimics the sky.

US 2016/0010811 A1 describes a lighting device including a mixing chamber having an array of apertures in one wall, a light source to supply light into the mixing chamber, and an array of optical elements outside the mixing chamber, each optical element positioned to cooperate with a respective one of the apertures to emit light from the mixing chamber as a beam. The shape, size, and/or direction of the output light beam are controllably varied by controlling the shape, size, and/or position of each aperture relative to its associated optical element.

However, such lighting devices are meant to generate a strong directional beam of light which not meant to directly look into.

Also, it appears that some observers have difficulty in fusing the image of their left and right eye into one single image at infinity.

Hence, there is a desire to provide a lighting device with which a virtual image is created closer to its surface and which allows observing the effect in a wider viewing range, and which defines concepts that offer comparable light effects embedded in a standard-like lighting device at a reasonable price point, with low weight and limited thickness.

SUMMARY OF THE INVENTION

It is an object of the present invention to overcome this problem, and to provide a lighting device with which a virtual image is created closer to its surface and which allows observing the effect in a wider viewing range, and with which concepts are defined which offer comparable light effects embedded in a standard-like lighting device at a reasonable price point, with low weight and limited thickness.

According to a first aspect of the invention, this and other objects are achieved by means of a lighting device comprising a light generating element and a micro-lens array comprising a focal plane, where the light generating element comprises a first light generating component and a second light generating component, where the first light generating component comprises a light emitting surface adapted for providing a diffuse light output component, and where the second light generating component comprises at least one array of light sources adapted for providing a directional light output component, where the light generating element is arranged to emit a light output towards the micro-lens array, the light output being formed by a superposition of the diffuse light output component and the directional light output component, and where the array of the light sources is located in the focal plane of the micro-lens array.

Thereby a lighting device is provided with which, in operation, each aperture of the reflective sheet together with a lens of the micro-lens array creates a light beam having an angular spread that is determined by the radius of the aperture and the focal distance of the lens. A person looking at the lighting device will only see one or a few light extraction elements and thus one or a few light beams, because the light from all other light extraction elements will not reach his eyes. When the person changes his viewpoint, a different sub-set of light beams becomes visible, thereby creating the illusion of a moving light source.

Particularly, by providing a light emitting device where the first light generating component comprises a light emitting surface adapted for providing a diffuse light output component, and where the second light generating component comprises at least one array of light sources adapted for providing a directional light output component, where the light generating element is arranged to emit a light output towards the micro-lens array, the light output being formed by a superposition of the diffuse light output component and the directional light output component, and in particular where the array of the light sources is located in the focal plane of the micro-lens array, a light emitting device is provided with which the resulting virtual image becomes a very convincing representation for a viewer. Furthermore, such a light emitting device has a highly improved efficiency as compared to the prior art.

By way of example, such a light emitting device may provide a travelling sun (follow-you sun) effect by mimicking the natural effect that the sun or moon or stars appear to move through the sky, along with the movement of the observer and his or her relative position to the light emitting device. This creates an effect that in nature can otherwise only be achieved by quasi-infinite distances.

Thus, a lighting device with which concepts are defined which offer comparable light effects embedded in a standard-like lighting device at a reasonable price point, with low weight and limited thickness, is provided for.

In an embodiment, the lighting device further comprises at least one light source adapted for, in operation, emitting light in a direction of propagation, where the first light generating component comprises a light mixing element in which the at least one light source is arranged, where the light emitting surface is a cover layer forming part of light mixing element, the cover layer being arranged downstream of the at least one light source in the direction of propagation, where a micro-lens array is arranged downstream of the cover layer in the direction of propagation, wherein the array of light sources is at least one array of light extraction elements, and where the cover layer of the light mixing element is a diffusely transparent layer with the at least one array of light extraction elements arranged therein.

Thereby, a light emitting device with a particularly simple construction achieving the above-mentioned advantages is provided for.

In an embodiment the light extraction elements are apertures, and the cover layer comprises at least two arrays of apertures with different aperture pitches, $p_{Ai}$, where i denotes the number of the array of apertures and i is an integer being 1 or more.

By providing more than one array of apertures, the resulting images will, when viewed by a person looking at the lighting device, seem to be present at different depths behind the lighting device. This in turn provides a strong 3D effect and thus also a higher degree of detail in the image without compromising the compactness and low weight of the lighting device.

In a further embodiment the light extraction elements are apertures, and the micro-lens array comprises a micro-lens pitch, $p_L$, the array, or each array, of apertures comprises an aperture pitch $p_{Ai}$, and the aperture pitch, or each of the aperture pitches, and the micro-lens pitch are chosen such as to fulfill the relation $p_{Ai} \leq p_L$, where i denotes the number of the array of apertures and i is an integer being 1 or more.

Thereby, it is ensured that even observers having difficulties doing so can fuse the image of their left and right eyes into one single image, and that this effect is allowed to be visible in a sufficiently broad viewing range.

In an embodiment the light extraction elements are apertures, and the micro-lens array comprises a micro-lens pitch, $p_L$, the array, or each array, of apertures comprises an aperture pitch $p_{Ai}$, and the aperture pitch, or each of the aperture pitches, and the micro-lens pitch are chosen such as to fulfill the relation $(p_L - p_{Ai}) \leq r_i$, where r is the radius of the apertures and i denotes the number of the array of apertures and i is an integer being 1 or more.

Thereby it is provided for that the angular spread of the light beams are equal to or larger than the separation between the light beams. This in turn has the effect of providing a smoother viewing experience of a moving light source.

In an embodiment the micro-lens array is covered by a cover layer having opaque regions defining an image on a transparent background.

Thereby, a lighting device in which the illusion of moving parallax can be enhanced is provided for. For instance, in the example of the image of the tree, the leaves and branches will dynamically block the light as the observer walks by.

In an embodiment any one of a honeycomb-grid and a square grid is arranged between the light extraction elements and the micro-lens array. In a particular embodiment the said grid is a black grid and/or a low height grid. Providing such a grid prevents cross talk by blocking at least some of the light that is responsible for the cross talk. In an alternative embodiment this effect may be obtained by providing a micro-lens array with sufficiently strong lenses.

In an embodiment the lighting device comprises at least two light sources, the at least two light sources being LEDs with different correlated color temperatures (CCTs) positioned differently on a substrate.

Thereby a person looking at the lighting device will experience an effect of a moving light source with changing color temperature.

In an embodiment the at least one light source is arranged at a position in the light mixing element opposite to the cover layer, and the at least one light source is covered with a diffusively transmissive layer.

Thereby, a lighting device with which a more even spread of the light emitted by the at least one lighting device is provided for.

In an embodiment the light extraction elements are circular light extraction elements or circular apertures.

Thereby a particularly simple array of light extraction elements is provided for.

In an embodiment the light extraction elements are specular light extraction elements or light extraction features.

In an embodiment the light extraction elements comprise at least two mutually different shapes. In an alternative or additional embodiment, the light extraction elements comprise at least two mutually different sizes.

Thereby a further enhanced and improved 3D effect is provided for.

The light mixing element may be a light mixing chamber, which is especially suitable when the light extraction features are apertures. Alternatively, the light mixing element may be a light guide, in which case specular light extraction elements or features are especially suitable.

In an embodiment the lighting device further comprises a spacer glass element arranged between the semi-transparent cover layer comprising the array of light extraction elements and the micro-lens array.

Thereby, a lighting device with a component which allows for additional adjustment of the angular spread of the light emitted by the at least one light source as well as of the position of the focal point of the micro-lens array is provided for.

In an embodiment the semi-transparent cover layer comprising an array of light extraction elements is a collimating element comprising a collimating glass element.

Thereby, an improved control of the angular spread of the light emitted by the at least one light source is provided for.

In an embodiment the light generating element comprises a light guide having a front surface facing towards the micro-lens array, a back surface facing away from the micro-lens array, and an edge surface separating the front surface from the back surface, and a first plurality of LEDs for emitting light into the light guide via the edge surface, the light guide has a first set of light outcoupling structures representing the first light generating component for providing the diffuse light output component, and the light guide has a second set of light outcoupling structures representing the second light generating component for providing the directional light output component.

Thereby, an alternative light emitting device with a particularly simple construction achieving the above-mentioned advantages is provided for.

In an embodiment, the first set of light outcoupling structures is formed by light scattering particles embedded in the light guide, and the second set of light outcoupling structures is formed by an array of specular light extraction elements provided on at least one of the front surface and the back surface of the light guide.

Thereby, a further simplification of the construction achieving the above-mentioned advantages is provided for.

In an embodiment, the light generating element comprises a light guide having a front surface facing towards the micro-lens array, a back surface facing away from the micro-lens array, and an edge surface separating the front surface from the back surface, and a first plurality of LEDs for emitting light into the light guide via the edge surface, the light guide has a first set of light outcoupling structures representing the first light generating component for providing the diffuse light output component, and the light generating element further comprises a second plurality of LEDs provided on at least one of the front surface and the back surface of the light guide, each of the second plurality of LEDs being a micro- or mini-LED, the second plurality of LEDs representing the second light generating component for providing the directional light output component.

Thereby, another alternative light emitting device with a particularly simple construction achieving the above-mentioned advantages is provided for.

Also, providing such a transparent light guide provides for a lighting device which may provide further lighting effects. A further advantage of such a light guide is that color and amount of the background light can be varied. Normally, a homogeneous color is required but for this application the color may vary a bit, thus mimicking a blue sky and some clouds. The thus obtained sun-like light will pass this very slightly scattering material without too much scatter of its beam because it sees only a few mm of material. Light coupled in from the side sees 100-1000 mm of this material which is sufficient for out-coupling.

The transparent light guide may be made of a scattering material. The transparent light guide may be side illuminated by means of LEDs emitting blue light.

A suitable light guide for this embodiment is an End-Lighten sheet or light guide of the type sold by Evonik company. Thereby, a lighting device which may provide the lighting effect of a blue sky or similar is provided for.

The present invention also relates to a lighting device being or being used as any one of a luminaire, an office ceiling lighting device, a wall lighting device, a hospitality lighting device, a retail lighting device, and a lighting device configured for confined spaces outside view, such as in corridors and elevators.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
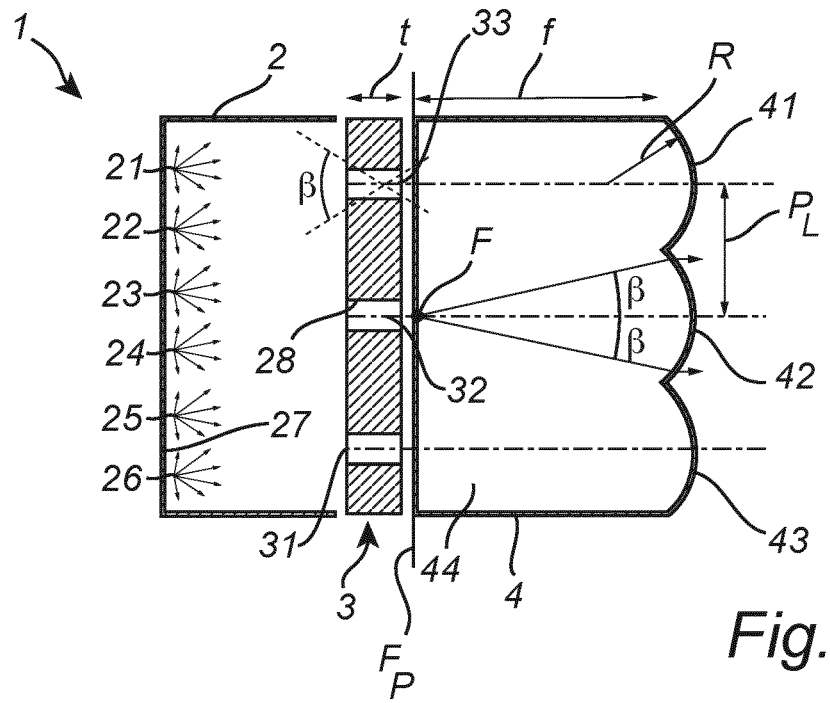
FIG. 1 shows a cross-sectional view of a first embodiment of a lighting device according to the invention.

FIG. 1 shows a lighting device 1 according to a first embodiment of the invention. Generally, and irrespective of the embodiment, the light emitting device comprises a light generating element comprising a first light generating component 2, the first light generating element comprising a surface 28 providing a diffuse light output component, and a second light generating component 3, the second light generating component comprising an array of light sources 31-33 generating a directional light output component, and a micro-lens array 4. The light generating element of the lighting device 1 is thus generally and irrespective of the embodiment arranged to emit a light output being formed as a superposition of the diffuse and directional light output components. Also, and still generally and irrespective of the embodiment, the second light generating component 3 is arranged in the focal plane $F_P$ of the micro-lens array 4, for instance such that the plane of the second light generating component 3 coincide with the focal plane $F_P$ of the micro-lens array 4.

In the particular embodiment shown in FIG. 1, the light emitting device further comprises at least one light source 21-26. Typically, the one or more light sources 21-26 are LEDs. More particularly, in the specific example of FIG. 1, six light sources 21-26 are provided for. The light sources 21-26 are adapted for, in operation, emitting light in a direction of emission. The direction of emission or the direction of propagation of the light emitted by the at least one light source 21-26, is generally towards the array of light extraction elements 3 and the micro-lens array 4. The light sources 21-26 may be covered partially or fully with a diffusive layer or coating. A light guide with light sources at its edges and light extraction elements at its surface may also serve as a mixing element.

Generally, and irrespective of the embodiment, the light sources may be LEDs, such as LEDs of the same color or of one or more different colors, or LEDs the same color temperature or with different correlated color temperatures.

The first light generating component 2 is a light mixing element 2, which is typically provided as a chamber in the form of a box comprising a bottom surface or wall 27 and a cover layer 28. The wall 27 and the cover layer 28 are mutually opposite parts of the light mixing element 2. The light sources 21-26 are arranged in the light mixing element 2 at the wall 27 opposite to the cover layer 28. The cover layer 28 is arranged, when seen in the direction of propagation of the light emitted by the at least one light source 21-26, in front of, or downstream of, the at least one light source 21-26. The bottom surface or wall 27 may be reflective or provided with a reflective coating or film or surface layer. Alternatively, the first light generating component 2 may be a light guide.

The cover layer 28 is a diffusely transparent layer. The cover layer 28 comprises a thickness t. The cover layer 28 comprises at least one array 3 of apertures 31-33 therein forming the light extraction elements 3. The light extraction elements 3 may also be other suitable light extraction features than apertures. Especially, when the first light generating component 2 is a light guide, the second light generating component, or the light extraction elements, can be specular light extraction elements or features.

The diffusely transparent part of the cover layer 28 is thus adapted for providing a diffuse light output component and the at least one array 3 of apertures 31-33 is adapted for providing a directional light output component. The at least one array 3 of apertures comprises an aperture pitch, $p_A$. The cover layer 28 may additionally or alternatively be a reflective layer. Such a reflective layer may be provided to enhance the efficiency of the light generation.

The array 3 of apertures may have the same shape, such a circular, oval or rectangular or any other shape. Alternatively, the array 3 of apertures may comprise apertures with different shapes, such a circular, oval or rectangular or any other shape or combination thereof. Alternatively, or additionally, the array of apertures 3 may comprise apertures with different sizes.

Figure 2:
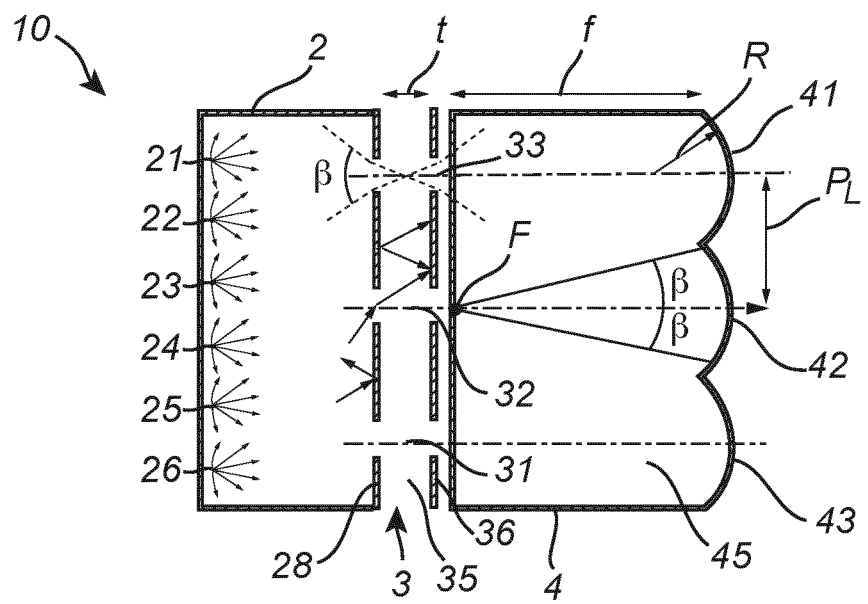
FIG. 2 shows a cross-sectional view of a second embodiment of a lighting device according to the invention.

The micro-lens array 4 comprises a plurality of micro-lenses 41-43. The micro-lens array 4 is arranged, when seen in a direction of propagation of the light emitted by the at least one light source 21-26, in front of the cover layer 28 or downstream of the cover layer 28. The micro-lens array 4 comprises a micro-lens pitch, $p_L$. Each micro-lens 41-43 comprises a radius of curvature R. The micro-lens array 4 may be made of a suitable glass material 44 (FIGS. 1 and 3) or polymer material 45 (FIG. 2). The micro-lens array 4 further comprises a focal distance f, a focal point F and a focal plane $F_P$, in which the focal point F is situated. The light extraction elements 31-33 may be arranged in the focal plane $F_P$ of the micro-lens array 4, i.e. such that the plane of the light extraction elements 31-33 coincide with the focal plane $F_P$ of the micro-lens array 4.

The light mixing element 2 is in other words covered by a diffusely transparent sheet 28 with an array of tiny light extraction elements 31-33 in the form of apertures. The light extraction elements 31-33 may be arranged in the focal plane $F_P$ of the micro-lens array 4. Each pair of aperture 31-33 and lens 41-43 creates a narrow directional light beam with an angular spread a determined by the radius $r_i$ of the aperture 31-33 and the focal distance $f_i$ of the micro-lens 41-43 as described by:

$$\alpha = \sin^{-1}\left(\frac{n_2}{n_1}\sin\left(\tan^{-1}\frac{r_i}{f_i}\right)\right).$$

This equation expresses the beam half-angle α as a function of refractive indices $n_1$ (air) and $n_2$ (lens array), aperture radius $r_i$ and lens focal distance $f_i$. It should be noted that this equation presupposes a situation where the micro-lenses are thick micro-lenses. Embodiments with thin micro-lenses with air spacer or thin micro-lenses with additional glass or light guide spacer (optionally with a different refractive index) are not described with this equation.

Thus, and generally for all embodiments of the invention, in operation light emitted by the light sources 21-26 are mixed in the light mixing element 2 and optionally collimated such as to obtain a beam spread of β/2 at the array 3 of light extraction elements. This beam spread can be achieved, for instance, by the use of an array of vertical lamellae limiting the beam spread, or by using as a mixing element a light guide with specular light extraction features, or by other means know to a person skilled in the art. In an embodiment, β/2 equals 13 degrees or less. At the cover layer 28 with the array 3 of light extraction elements the light propagating through the diffusely transparent part of the cover layer 28 forms a diffuse output lighting component and light propagating through the light extraction elements 31-33 of the at least one array 3 of light extraction elements forms a directional output lighting component with a beam half-angle α. In an embodiment, the beam half-angle α equals 2 degrees or less. The lens array 4 then forms the two output lighting components into an image that is experienced by the viewer. As used herein, a denotes the beam angle of the light that emerges from the device, while R denotes the beam angle in which the light is focused by the micro-lens (numerical aperture).

FIG. 2 shows a lighting device 10 according to a second embodiment of the invention. The lighting device 10 of FIG. 2 differs from that of FIG. 1 only in the construction of the cover layer 28 and array of light extraction elements 3. In this case the lighting device 10 comprises a collimating glass element 36 provided with a layer or coating 28 and 36 on each of two opposing surfaces facing towards the light sources 21-26 and the micro-lens array 4, respectively. The collimating glass element 36 may for instance be a glass plate/spacer which in combination with coating patterns applied on its planes provide the light collimation functionality.

The coating 28 facing towards the light sources 21-26 forms the cover layer 28, and the coating 36 facing the micro-lens array 4 is a collimator coating. Both coatings 28 and 36 are provided with an array of light extraction elements 31-33. The array of light extraction elements 31-33 of the cover layer 28 and of the collimator coating 36, respectively, may be identical in position and/or shape and/or size or they may be different in position and/or shape and/or size.

Figure 3:
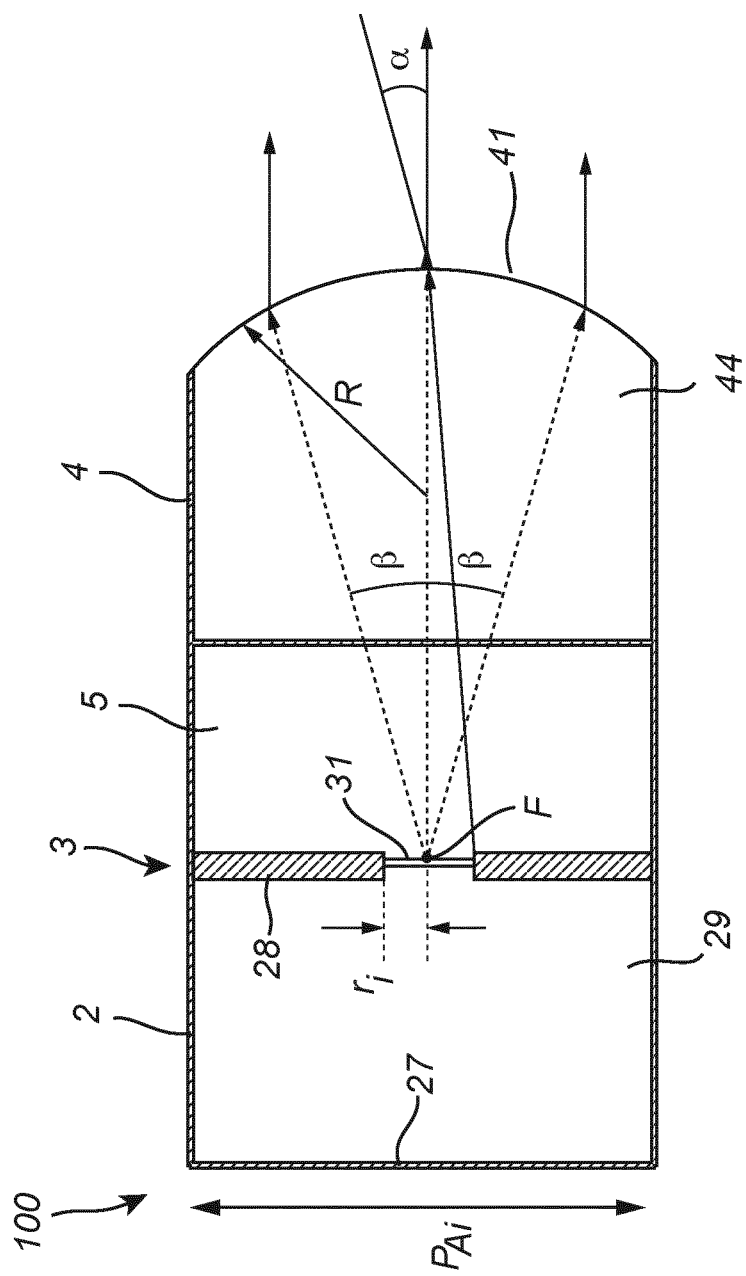
FIG. 3 shows a cross-sectional view of a third embodiment of a lighting device according to the invention.

FIG. 3 shows a lighting device 100 according to a third embodiment of the invention. The lighting device 100 of FIG. 3 differs from that of FIG. 1 only in virtue of the following features.

The lighting device 100 comprises a light mixing element 2 in the form of a glass material 29 with a coating or layer 28 in which the array of light extraction elements 3 is formed. Furthermore, a spacer glass material 5 is arranged between the array of light extraction elements 3 and the micro-lens array 4. The spacer glass material 5 ensures that the aperture 31 and the focal plane of the micro-lens 41 coincide. I spacer glass material 5 may be used as a light guide to distribute and extract light from a second light source.

Figure 4:
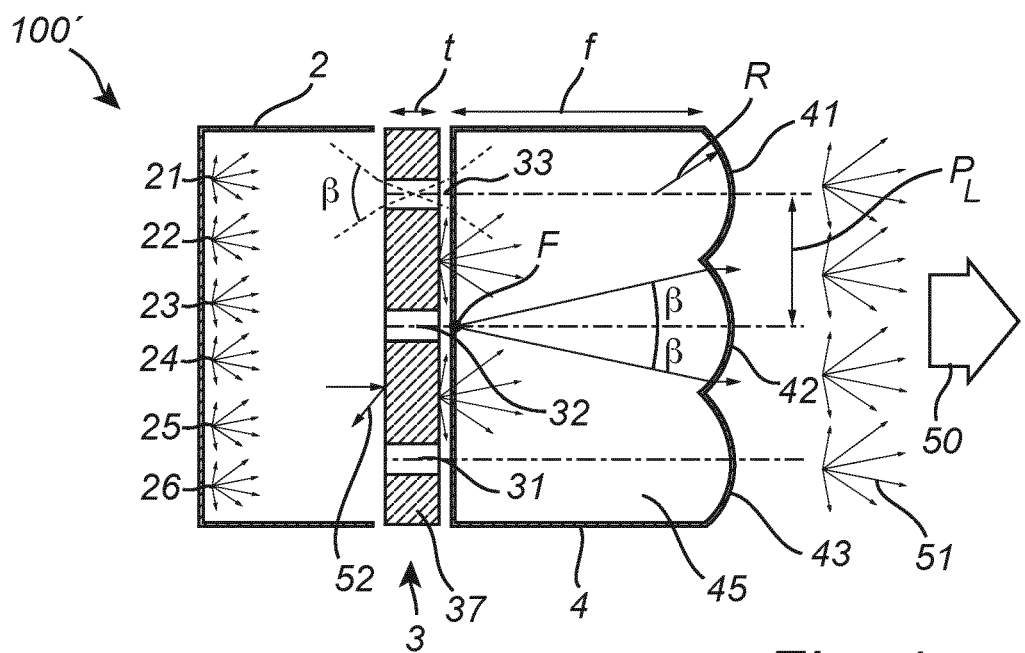
FIG. 4 shows a cross-sectional view of a fourth embodiment of a lighting device according to the invention.

FIG. 4 shows a lighting device 100' according to a fourth embodiment of the invention. The lighting device 100' of FIG. 4 differs from that of FIG. 1 in that the first light generating component 2 is a light guide and that the second light generating component 3 is an array of specular light extraction elements. The lighting device 100' of FIG. 4 further differs from that of FIG. 1 in that a coating which reflects yellow light (arrow 52) and transmits blue light (arrow 51) is provided. This mimics a diffuse blue sky while increasing the efficiency of the directional beam. To this end the lighting device 100' comprises a layer 37 which is transparent for blue light and which reflects yellow light, and which comprises light extraction elements 31, 32, 33. The layer 37 may furthermore provide the transmitted blue light with a diffuse effect. For example, a layer 37 of one or more simple dichroic coatings could transmit blue light and reflect yellow light. The light transmitted through the light extraction elements 31, 32, 33 is emitted as directional white light (arrow 50).

Figure 5:
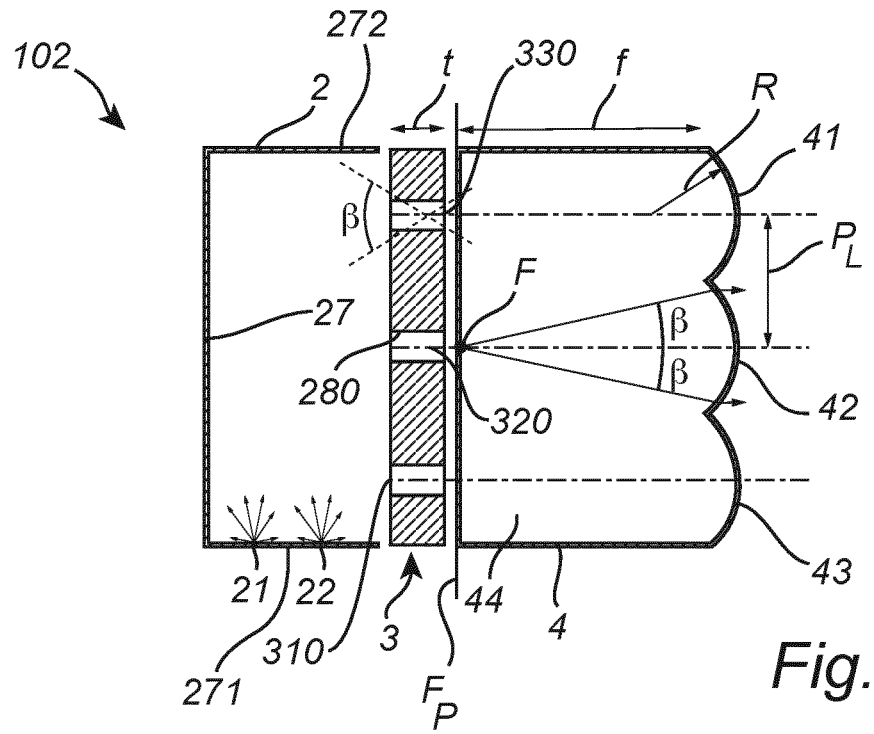
FIG. 5 shows a cross-sectional view of a fifth embodiment of a lighting device according to the invention.

FIG. 5 shows a lighting device 102 according to a fifth embodiment of the invention. The lighting device 102 of FIG. 5 differs from that of FIG. 1 in that the first light generating component is a transparent light guide 2 and that the second light generating component 3 is an array of light out-coupling structures 310, 320, 330 arranged on the transparent light guide 2. Furthermore, the light guide 2 comprises a wall 280 made of a scattering material. In other words, a part of the light guide 2 is in this embodiment made of a scattering material 280. Also, the light guide 2 is side lit, which in practice is obtained by arranging a plurality of light sources 21, 22, typically LEDs, at a side wall 271 or 272 of the light guide 2. As shown in FIG. 5 the light sources 21, 22 are arranged at the lower side wall 271 of the light source 2.

Figure 6:
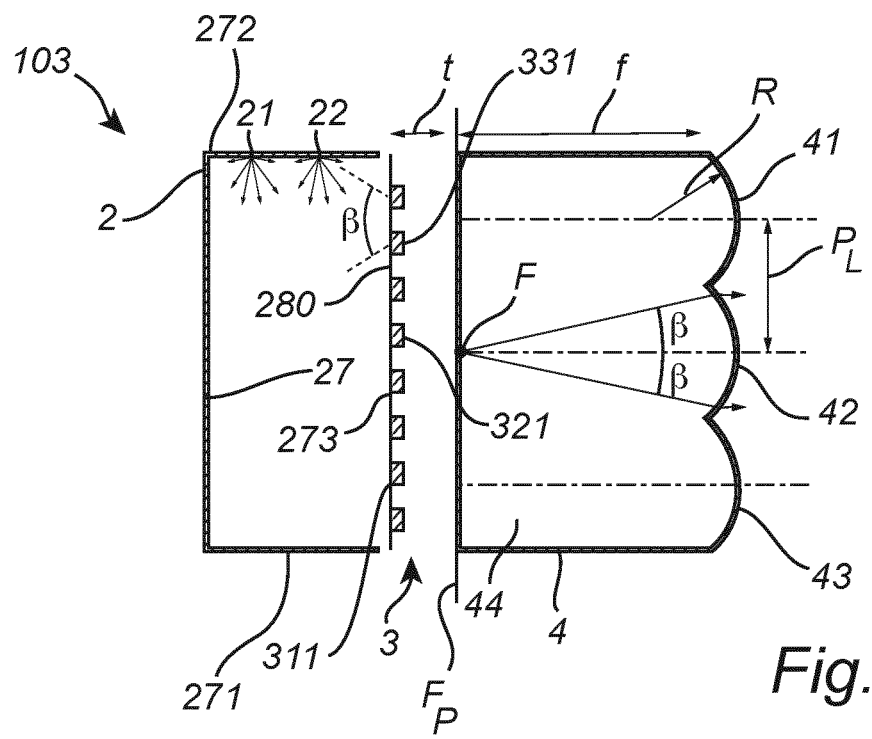
FIG. 6 shows a cross-sectional view of a sixth embodiment of a lighting device according to the invention.

FIG. 6 shows a lighting device 103 according to a sixth embodiment of the invention. The lighting device 103 of FIG. 6 differs from that of FIG. 5 mainly in that the second light generating component 3 here is provided as an array of micro-LEDs or mini-LEDs 311-331. The array of micro-LEDs or mini-LEDs 311-331 are arranged on a wall 273 of the light guide 2 facing towards the array of micro-lenses 4. Furthermore, as shown in FIG. 6 the light sources 21, 22 are arranged at the upper side wall 272 of the light source 2.

Figure 7:
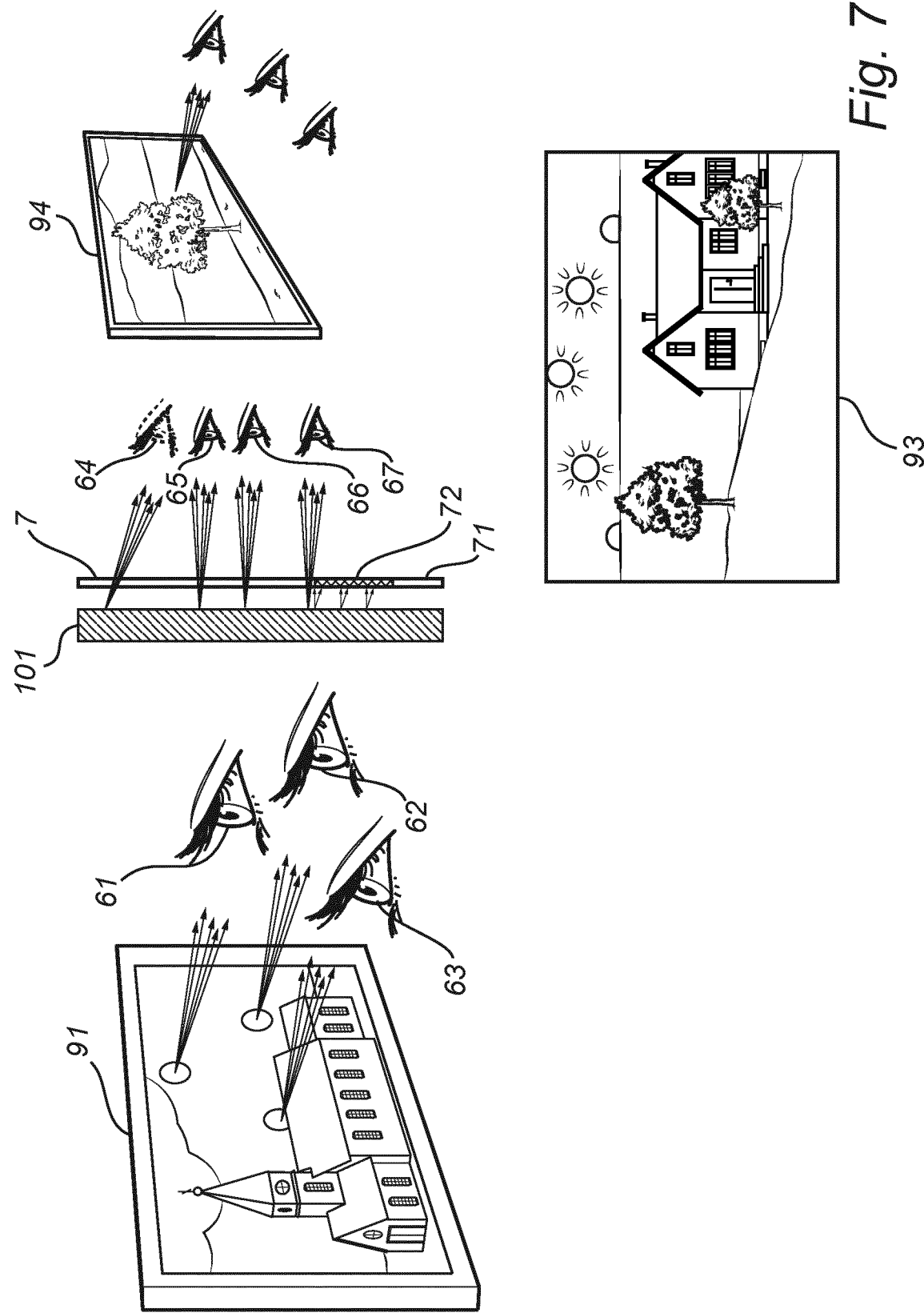
FIG. 7 schematically illustrates moving parallax optics and a possible application of a lighting device according to the invention as well as a light emitting device according to the invention and further comprising a cover.

FIG. 7 shows a lighting device 101 according to a seventh embodiment of the invention. The lighting device 101 of FIG. 7 may be a lighting device according to any one of the above or below described embodiments. The lighting device 101 is furthermore provided with a cover 7 which is provided with transparent regions 71 and opaque regions 72. The cover 7 is arranged on the micro-lens array 4. The cover 7 may be a plate, a layer or a coating. Alternatively, the cover 7 may be replaced with a light guide. Such a light guide may be a transparent light guide. Additionally, the transparent light guide may be made of a scattering material. Also, the light guide may be side illuminated by means of LEDs emitting light, such as, but not limited to, blue light.

FIG. 7 furthermore illustrates the eye 64-67 of a viewer observing a lighting device 101 according to the invention from four different positions. The viewer will see only one (or a few) aperture(s); the light from all other light extraction elements does not reach the eye. When moving the view point, e.g. from that of eye 64 to that of eye 66, a different aperture becomes visible, and the initial aperture becomes invisible. This creates the illusion of a moving light source as illustrated at 94, for instance a moving sun/moon/star effect, as well as an enhanced 3D effect as illustrated at 93. When the lighting device is covered by a colored transparency as illustrated at 94, e.g. as in a poster box, the illusion of moving parallax can be enhanced. For instance, in the example of the image 94 of the tree, the leaves and branches will dynamically block the light as the observer walks by.

At 91 a further application is illustrated. When the viewer (eyes 61-63) observes the color transparency 91, which is a transmissive display illuminated from the back by a strongly collimated light source obtained by means of a light emitting device according to the invention, a resulting image will display a moving sun illusion, appearing and disappearing depending on the position and movement of the observer.

Figure 8:
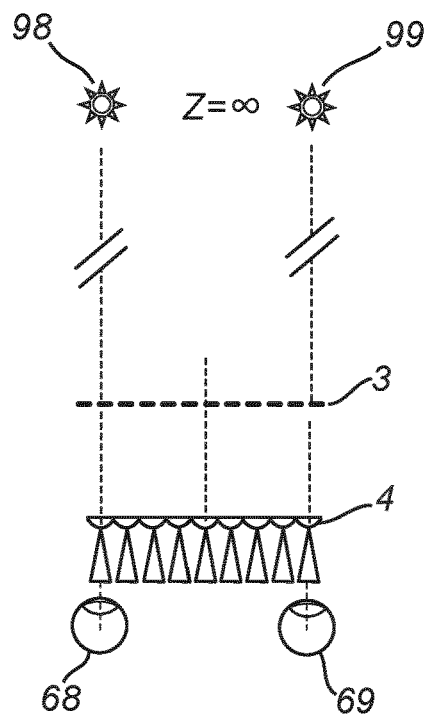
FIG. 8 schematically shows a lighting device according to the invention and configured to provide a virtual image or focus at infinity.
Figures 9, 10:
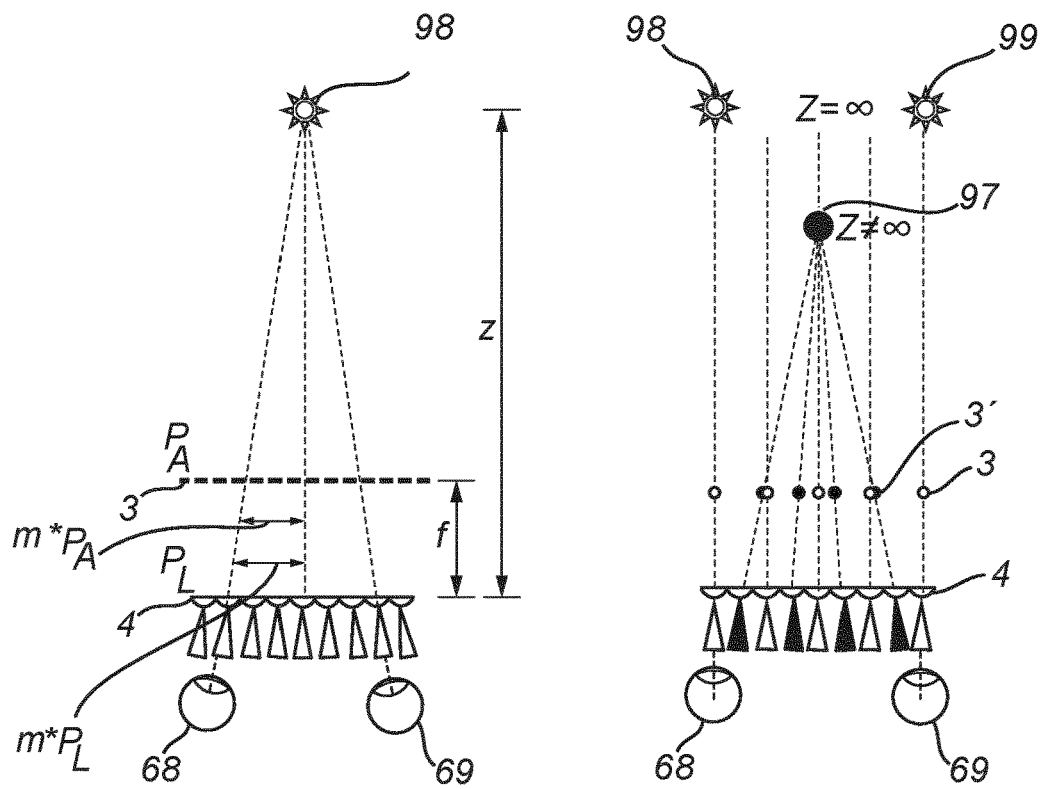
FIG. 9 schematically shows a lighting device according to the invention and configured to provide a virtual image or focus at a distance Z being different from infinity.
FIG. 10 schematically shows a lighting device according to the invention and configured to provide virtual images at various multiple depths.

FIG. 8 schematically shows a lighting device according to the invention comprising an array of light extraction elements 3 and a micro-lens array 4 and configured to provide a virtual image 98, 99 or focus at infinity. FIG. 9 schematically shows a lighting device according to the invention comprising an array of light extraction elements 3 and a micro-lens array 4 and configured to provide a virtual image 98 or focus at a distance Z being different from infinity. The lighting devices of FIGS. 6 and 7, respectively, may be a lighting device according to any one of the above or below described embodiments.

The initially described problem as experienced by some viewers (eyes 68, 69) is illustrated in FIG. 8. When the pitch, $p_A$, of the array of light extraction elements 3 is chosen equal to the pitch, $p_L$, of the micro-lens array, virtual images are created at infinity. The two eyes 68 and 69 of the observer receive two images and fuse these into one only if the eyes converge at infinity, i.e. if they are parallel. But there is a natural tendency to focus the eyes at closer distance, i.e. where the eyes converge at a distance less than infinity.

Thus, the observer may experience difficulties with fusing the two images into one. The design choice to create a virtual image at infinity also implies that the light beams as drawn in FIG. 1 can only be seen when standing right in front of the device, and not when looking at it under some angle.

In contrast, and as shown in FIG. 9, if the pitch, $p_A$, of the array 3 of apertures forming the light extraction elements is chosen to be smaller than the pitch, $p_L$, of the micro-lens array 4 the following applies. From equal angles the following relation holds true:

$$(m*p_A)/(Z-f_a)=(m*p_L)/Z,$$

where m is any integer number, $p_A$ is the pitch of the aperture array, $p_L$ is the pitch of the micro-lens array, $f_a$ is focal length of the micro-lens array in air and Z is the distance from the micro-lens array to the virtual image. From the above equation it follows that the virtual image will appear at a distance $$Z=f_a*1/(1-(p_A/p_L))$$

This is illustrated in FIG. 9. Also, when the observer stands a bit to the right or left of the light emitting device, an image can still be seen. This is in contrast to some prior art solutions, where all light beams emerge perpendicular to the device and when observed from an angle no light reaches the eyes.

By way of examples: If $p_A=p_L$, then Z becomes infinity. If $p_{Ai}=0.99*p_L$, then Z is 100 times the focal length f Finally, if $p_{Ai}=0.98*p_L$, then Z is 50 times the focal length $f_a$.

In order to have a smooth viewing experience of smooth moving of the image across the lighting device, the angular spread a of the directional light beams need to be equal to or larger than the angular distance in between the individual light beams propagating after each of the micro-lenses of the micro-lens array. For that the following relation need to be fulfilled.

$$(p_L-p_A) \leq r_i.$$

Therefore, the aperture pitch and the micro-lens pitch are in some embodiments chosen such as to fulfill the relation $p_{Ai} \leq p_L$.

FIG. 10 schematically shows a lighting device according to the invention comprising two arrays of apertures forming the light extraction elements, namely a first array of apertures 3 and a second array of apertures 3', and a micro-lens array 4. The lighting device of FIG. 10 may be a lighting device according to any one of the above described embodiments. The first array of apertures 3 has a pitch equal to the pitch of the micro-lens array 4, and consequently the resulting image appears at infinity. The second array of apertures 3' has a smaller pitch than that of the micro-lens array 4, and the resulting image appears closer. The lighting device of FIG. 10 is thus configured to provide by means of the first array of apertures 3 a virtual image 98, 99 or focus at a distance Z being equal to infinity, and to provide by means of the second array of apertures 3' a virtual image 97 or focus at a distance Z being different from infinity. Hence, FIG. 10 illustrates how various images 97, 98, 99 can be created at different depths.

Thus, in the embodiment shown in FIG. 10, the cover layer of the light emitting device comprises at least two arrays of apertures with different aperture pitches, $p_{Ai}$, where i denotes the number of the array of apertures Ind i is an integer being 1 or more. The micro-lens array comprises a micro-lens pitch, $p_L$. Each of the aperture pitches and the micro-lens pitch are chosen such as to fulfill the relation $p_{Ai} \leq p_L$.

Furthermore, each of the aperture pitches and the micro-lens pitch may be chosen such as to fulfill the relation $(p_L-p_{Ai}) \leq r_i$, where r is the radius of the apertures and i denotes the number of the array of apertures and i is an integer being 1 or more.

To create an effect of moving sun with changing color temperature (e.g. lower correlated color temperature (CCT) when viewed from the large angles and higher CCT viewing from right in front of the lighting device) the light mixing element 2 may in an embodiment be provided with a non-uniform but smooth spatial color or CCT distribution. This can be realized e.g. by employing LEDs with different CCTs positioned differently on a substrate, such as a PCB, and covered with a diffuser plate.

Also, a 3D effect may be generated. When using simple round apertures, all of the same shape, such a 3D effect is not exploited. But with an array of shapes, like printed 3D-views of a 3D object, each eye will see a different 3D-view, and a 3D image results.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

LIST OF VARIABLE SIZES

α Beam half angle (angular spread) of a light beam having propagated through a pair of aperture and lens
β Acceptance angle of the micro-lenses of the micro-lens array
$f_a$ Focal distance of the micro-lens array in air
$f_i$ Focal distance of the micro-lens array
F Focal point of the micro-lens array
$F_P$ Focal plane of the micro-lens array
i Integer number, i≥1
m Any integer number
$n_1$ Refractive index of air
$n_2$ Refractive index of micro-lens array
$p_{Ai}$ Pitch of $i^{th}$ aperture
$p_L$ Pitch of micro-lens array
$r_i$ Radius of the aperture
t Thickness of array of light extraction elements/collimator
R Radius of curvature of lens of micro-lens array
Z Distance to virtual image

LIST OF REFERENCE NUMERALS 1, 10, 100, 100',101 Lighting device
2 Light mixing element
21-26 Light Sources
27 Bottom of light mixing element
271-273 Sides of light guide
28 Diffusive layer with light extraction elements
280 Scattering material
29 Aperture glass
3, 3' Array of light extraction elements
31-33 Light extraction elements 310-330 Light out-coupling structures
311-331 Array of micro-LEDs
34 Collimator
35 Collimator glass
36 Collimator coating
37 Layer
4 Micro-lens array
41-43 Micro-lenses
44 Micro-lens glass
45 Micro-lens polymer
5 Spacer glass
50-52 Arrows
61-67 Eye(s) of the viewer
68 Left eye of the viewer
69 Right eye of the viewer
7 Cover layer
8 Light guide
91 Display
92 Display as seen by the viewer
93 Virtual 3D image as created by lighting device
94 Image of tree
97-99 Virtual images

The invention claimed is:

1. A lighting device comprising:
a light generating element, and
a micro-lens array comprising a focal plane (Fp),
wherein the light generating element comprises a first light generating component and a second light generating component,
wherein the first light generating component comprises a light emitting surface adapted for providing a diffuse light output component,
wherein the second light generating component comprises at least one array of light sources adapted for providing a directional light output component,
wherein the light generating element is arranged to emit a light output towards the micro-lens array, the light output being formed by a superposition of the diffuse light output component and the directional light output component, and
wherein the array of the light sources is located in the focal plane ($F_p$) of the micro-lens array.

2. A lighting device according to claim 1, and further comprising at least one light source adapted for, in operation, emitting light in a direction of propagation, wherein
the first light generating component comprises a light mixing element in which the at least one light source is arranged, wherein
the light emitting surface is a cover layer forming part of the light mixing element, the cover layer being arranged downstream of the at least one light source in the direction of propagation, wherein
a micro-lens array is arranged downstream of the cover layer in the direction of propagation, wherein
the array of light sources is at least one array of light extraction elements, and wherein
the cover layer of the light mixing element is a diffusely transparent layer with the at least one array of light extraction elements arranged therein.

3. A lighting device according to claim 2, wherein the light extraction elements are apertures, and wherein the cover layer comprises at least two arrays of apertures with different aperture pitches, $p_{Ai}$, where i denotes the number of the array of apertures and i is an integer being 1 or more.

4. A lighting device according to claim 2, wherein the light extraction elements are apertures, and wherein the micro-lens array comprises a micro-lens pitch, $p_L$, wherein the array, or each array, of apertures comprises an aperture pitch $p_{Ai}$, and wherein the aperture pitch, or each of the aperture pitches, and the micro-lens pitch are chosen such as to fulfill the relation $p_{Ai} \leq p_L$, where i denotes the number of the array of apertures and i is an integer being 1 or more.

5. A lighting device according to claim 2, wherein the light extraction elements are apertures, and wherein the micro-lens array comprises a micro-lens pitch, $p_L$, wherein the array, or each array, of apertures comprises an aperture pitch $p_{Ai}$, and wherein the aperture pitch, or each of the aperture pitches, and the micro-lens pitch are chosen such as to fulfill the relation $(p_L - p_{Ai}) \leq r_i$, where r is the radius of the apertures and i denotes the number of the array of apertures and i is an integer being 1 or more.

6. A lighting device (1) according to claim 2, wherein the at least one light source is arranged at a position in the light mixing element opposite to the cover layer, and wherein the at least one light source is covered with a diffusive layer.

7. A lighting device according to claim 2, wherein the light extraction elements comprise:
at least two mutually different shapes, and/or
at least two mutually different sizes, and/or wherein the light extraction elements are circular.

8. A lighting device according to claim 2, wherein the cover layer comprising an array of light extraction elements is a semi-transparent collimating element comprising a collimating glass element.

9. A lighting device according to claim 1, wherein the light generating element comprises:
a light guide having a front surface facing towards the micro-lens array, a back surface facing away from the micro-lens array, and an edge surface separating the front surface from the back surface, and
a first plurality of LEDs for emitting light into the light guide via the edge surface,
wherein the light guide has a first set of light outcoupling structures representing the first light generating component for providing the diffuse light output component, and
wherein the light guide has a second set of light outcoupling structures representing the second light generating component for providing the directional light output component.

10. A lighting device according to claim 9,
wherein the first set of light outcoupling structures is formed by light scattering particles embedded in the light guide, and
wherein the second set of light outcoupling structures is formed by an array of specular light extraction elements provided on at least one of the front surface and the back surface of the light guide.

11. A lighting device according to claim 1, wherein the light generating element comprises:
a light guide having a front surface facing towards the micro-lens array, a back surface facing away from the micro-lens array, and an edge surface separating the front surface from the back surface, and
a first plurality of LEDs for emitting light into the light guide via the edge surface,
wherein the light guide has a first set of light outcoupling structures representing the first light generating component for providing the diffuse light output component, and
wherein the light generating element further comprises a second plurality of LEDs provided on at least one of the front surface and the back surface of the light guide, each of the second plurality of LEDs being a micro- or mini-LED, the second plurality of LEDs representing the second light generating component for providing the directional light output component.

12. A lighting device according to claim 1, wherein the micro-lens array is covered by a cover layer having opaque regions defining an image on a transparent background.

13. A lighting device according to claim 2, wherein the lighting device further comprises a spacer glass element arranged between the light emitting surface comprising the array of light extraction elements and the micro-lens array.

14. A lighting device according to claim 1, and comprising at least two light sources, the at least two light sources being LEDs with different correlated color temperatures (CCTs) positioned differently on a substrate.

15. A lighting device according to claim 1, wherein the lighting device is any one of a luminaire, an office ceiling lighting device, a wall lighting device, a hospitality lighting device, a retail lighting device, and a lighting device configured for confined spaces outside view.

\* \* \* \* \*